2 Sheets—Sheet 1.
J. PRATT.
APPARATUS FOR MAKING SEAMLESS METAL TUBES.
No. 11,009.  Patented June 6, 1854.
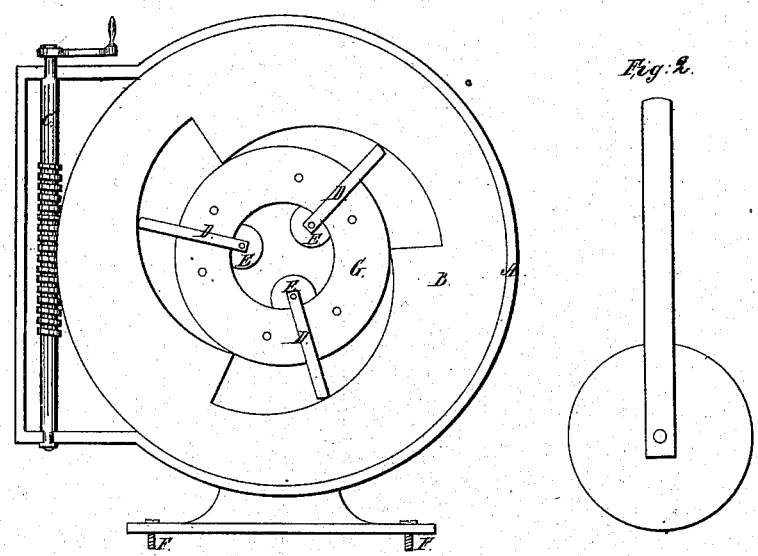
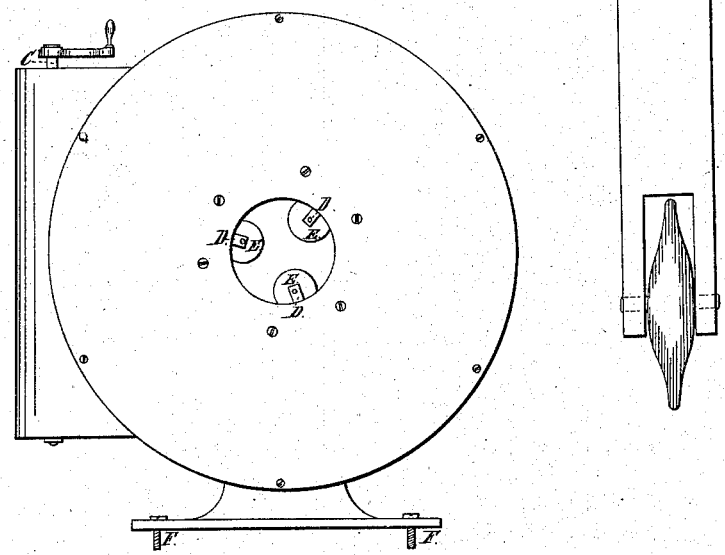

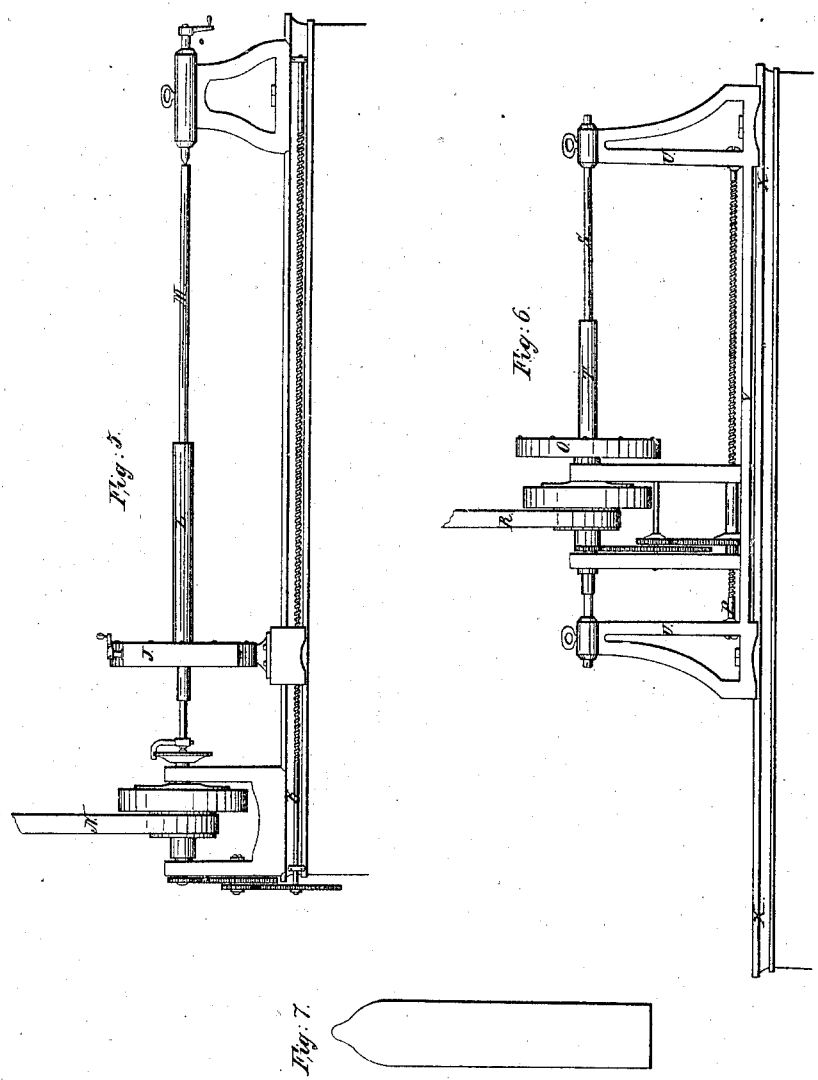

UNITED STATES PATENT OFFICE.

JARED PRATT, OF TAUNTON, MASSACHUSETTS.

MAKING SEAMLESS METAL TUBES.

Specification of Letters Patent No. 11,009, dated June 6, 1854.

*To all whom it may concern:*

Be it known that I, JARED PRATT, of Taunton, in the county of Bristol and Commonwealth of Massachusetts, have invented a new and useful Improvement in Machinery for Making Seamless Metal Tubes; and I do hereby declare that the following is a full, clear, and exact description of the same, reference being had to the annexed drawings, making a part of this specification, in which—

Figure 1 is a representation of the machine, with the cover removed, to show the internal arrangement; A shows the box or casing, C the screw operating upon toothed gear upon the circumference of B for the purpose of regulating the slides D D D and consequently the proximity of their rolls E E E. Fig. 2 is a side view of one of the rolls and its slide, and Fig. 3 an edge view of the same. Fig. 4 shows the machine complete, ready to be secured to the lathe or other apparatus, which gives it its parallel motion; by means of the screws F F. Fig. 5 shows the die as attached to a lathe, where J is the die, receiving its horizontal and parallel motion by means of the screw K, and also showing the operation of the die upon the tube L, which tube is placed upon the mandrel M, said mandrel and tube having a rotary motion communicated to them by means of the belt N. Fig. 6 shows the die as attached to a machine where the mandrel and tube upon it have a parallel and horizontal, and the die a rotary, motion. O represents the die, S the mandrel and T the tube. The mandrel and tube receive their parallel motion by means of the screw P. The belt that communicates rotary motion to the die and the proper motion to the screw is shown at R.

To enable others skilled in the art to make and use my invention I will proceed to a description of the same.

Within a metal box or casing as at A Fig. 1, there is fitted a wheel or ring, having upon its inner circumference, three or more inclined planes, corresponding to the number of slides and rolls used, and upon its outer circumference, toothed gear into which the screw C, Fig. 1, meshes, so that by the turning of the screw in either direction the space between the rolls E E E may be regulated. Within the circle of inclined planes upon the wheel B is a ring of metal G, Fig. 1, which is secured to the casing by means of screws or cast with it in the same piece. This ring is of sufficient thickness to give steadiness to the slides D D D. The casing, for a space of the size of the inner circumference of this ring G is cut away, thus forming a die whose rim contains an apparatus to regulate its size. When the various parts of this die are fitted together and secured, it is to be firmly attached to any machine that will give it a motion parallel to the tube upon which is operates.

Where it is desired to use the die, giving to it a motion parallel to the tube upon which it operates, having said tube revolve, I use an "engine lathe", so called, of any of the known patterns (preferring one, however, whose "tool-rest" is moved by a screw rather than an endless chain, as being more regular and uniform in its motion.) To the bed-piece of the tool-rest I firmly attach the die by means of the screws F, F, Fig. 4. Having placed the tube upon a mandrel whose length exceeds the length of the tube so much as I wish to draw out or lengthen said tube, I place it in the lathe in the same manner as any ordinary piece that I wished to "turn", first having passed it through the eye of the die. Receiving their motion through the belt N, Fig. 5, the mandrel and tube upon it have a rotary motion and the die a parallel motion; thus the rolls or tools upon the inner circle or eye of the die are pressed against the tube, causing it to elongate or be drawn out and thus accomplish the object desired. But should it be desirable to reverse the above described movements and give to the die a rotary motion and to the tube a horizontal motion parallel to the axis of the die, I secure the die upon the end of a hollow shaft, the hole through this shaft being sufficiently large to admit freely the mandrel and the tube. This shaft and with it the die, is made to revolve by means of a belt or gear connecting it to the operating power. The mandrel after being passed through the eye of the die and the hollow shaft and having placed upon it the tube, is secured between two uprights U U Fig 6. These uprights are permanently attached to a bed-piece V, Fig. 6, which bed-piece (and with it the uprights, mandrel and tube) is moved upon ways or slides X X, Fig. 6, by means of the screw P, Fig. 6, which screw takes its proper motion, by gear, from the shaft on which the die is fixed. Thus when the whole is set in motion by means of the belt R, Fig. 6, the same result is obtained as in the former method, that is, the pressure of the rolls or tools in the eye of the die against the tube, and its consequent reduction and elongation.

Fig. 7 is an edge view of a tool (and the peculiar form of its point) that may be substituted for the rolls and their slides in the eye of the die. These tools are fitted into the same spaces in the ring G, Fig. 1, that is occupied in that figure by the slides D D D. They are also made to approximate or diverge by means of the same series of inclined planes upon the wheel B, Fig. 1. When a rotary motion is given to the die, as shown in Fig. 6, these tools are to be preferred to rolls; but when rotary motion is given to the tube, I have found that the rolls work better; though in either case rolls or tools can be used with good results.

What I claim as of my invention and desire to secure by Letters Patent is—

Extending and finishing seamless metal tubes, by moving the mandrel and tube in a horizontal direction, while the rollers or their equivalent dies surrounding the tube are rotated; or moving the dies in a horizontal direction, and rotating the mandrel and tube, substantially as herein set forth.

JARED PRATT.

Witnesses:
 E. H. BENNETT,
 HENRY WILLIAMS.